United States Patent
Lavelle et al.

(10) Patent No.: US 7,805,050 B2
(45) Date of Patent: Sep. 28, 2010

(54) MOBILE VIDEO ENTERTAINMENT SYSTEM

(75) Inventors: Patrick M. Lavelle, Sayville, NY (US); Thomas C. Malone, Miller Place, NY (US); George C. Schedivy, Aquebogue, NY (US); James R. Tranchina, Dix Hills, NY (US)

(73) Assignee: Audiovox Corporation, Hauppauge, NY (US)

( * ) Notice: Subject to any disclaimer, the term of this patent is extended or adjusted under 35 U.S.C. 154(b) by 1175 days.

(21) Appl. No.: 11/140,663

(22) Filed: May 27, 2005

(65) Prior Publication Data

US 2005/0232585 A1 Oct. 20, 2005

Related U.S. Application Data

(63) Continuation of application No. 09/698,917, filed on Oct. 27, 2000, now Pat. No. 6,975,806.

(51) Int. Cl.
*H04N 7/00* (2006.01)
*H04N 7/26* (2006.01)

(52) U.S. Cl. ......................................... 386/46; 386/124
(58) Field of Classification Search ................... 386/46, 386/125, 124, 45, 105, 106, 1
See application file for complete search history.

(56) References Cited

U.S. PATENT DOCUMENTS

| D275,819 S | 10/1984 | Leiserson | D3/33 |
|---|---|---|---|
| 4,633,323 A | 12/1986 | Haberkern et al. | 348/838 |
| 4,635,110 A | 1/1987 | Weinblatt | 358/93 |
| 4,658,298 A | 4/1987 | Takeda et al. | 358/254 |
| 4,843,477 A | 6/1989 | Mizutani et al. | 358/248 |
| 5,044,321 A | 9/1991 | Selph | 119/96 |
| 5,326,175 A | 7/1994 | Carter | 383/22 |
| 5,555,466 A | 9/1996 | Scribner et al. | 348/8 |
| 5,775,762 A | 7/1998 | Vitito | 296/37.7 |
| 5,805,412 A | 9/1998 | Yanagisawa et al. | 361/686 |
| 5,822,546 A | 10/1998 | George | 395/281 |

(Continued)

FOREIGN PATENT DOCUMENTS

GB 2194434 * 3/1988

(Continued)

OTHER PUBLICATIONS

Notice of Allowance and Fee(s) Due from corresponding U.S. Appl. No. 09/698,917, now U.S. Patent No. 6,975,806, Apr. 20, 2005.

(Continued)

*Primary Examiner*—Robert Chevalier
(74) *Attorney, Agent, or Firm*—F. Chau & Associates, LLC

(57) ABSTRACT

A mobile video system comprising a video player having a hinge and a display pivotally attached on the hinge. The video player and the display are contained by a bag which is preferably suspended from and fastened to seats with adjustable straps for viewing by a user, the bag having extensible mesh side panels to facilitate air circulation around the video player and a flap cover that can be opened to access the display.

The video player includes a display pivotally attached to a video player that can be flipped up and adjusted to a desired angle for viewing by the user and flipped down when not in use.

25 Claims, 5 Drawing Sheets

U.S. PATENT DOCUMENTS

| | | | |
|---|---|---|---|
| 5,868,294 A | 2/1999 | Webster | 224/275 |
| 5,927,784 A | 7/1999 | Vitito | 296/37.7 |
| 6,092,705 A | 7/2000 | Meritt | 224/275 |
| 6,097,448 A | 8/2000 | Perkins | 348/837 |
| 6,181,387 B1 | 1/2001 | Rosen | 348/837 |
| D438,853 S | 3/2001 | Iino | D14/136 |
| 6,216,927 B1 | 4/2001 | Meritt | 224/275 |
| 6,283,299 B1 | 9/2001 | Lee | 206/760 |
| 6,304,173 B2 | 10/2001 | Pala et al. | 340/461 |
| 6,339,455 B1 | 1/2002 | Allan et al. | 348/837 |
| 6,393,745 B1 | 5/2002 | Miki | 40/586 |
| 6,473,315 B2 | 10/2002 | Denmeade | 361/831 |
| 6,522,368 B1 | 2/2003 | Tuccinardi et al. | 348/837 |
| 6,608,399 B2 | 8/2003 | McConnell et al. | 307/10.1 |
| 6,663,155 B1 | 12/2003 | Malone et al. | 296/37.8 |
| 7,019,784 B1 * | 3/2006 | Shibuya et al. | 348/373 |
| 2004/0212957 A1 | 10/2004 | Schedivy | |

FOREIGN PATENT DOCUMENTS

| | | |
|---|---|---|
| GB | 2194434 A | 3/1988 |

OTHER PUBLICATIONS

Office Action mailed Nov. 29, 2004 from corresponding U.S. Appl. No. 09/698,917 now U.S. Patent No. 6,975,806.

* cited by examiner

MOBILE VIDEO ENTERTAINMENT SYSTEM

CROSS-REFERENCE TO RELATED APPLICATION

This application is a Continuation of U.S. application Ser. No. 09/698,917, filed on Oct. 27, 2000, now U.S. Pat. No. 6,975,806 the entirety of which is incorporated by reference herein.

BACKGROUND

1. Technical Field

The present invention relates generally to mobile video systems, and more specifically, to a mobile video system having a pivotable display attached to a video player.

2. Description of Related Art

As society becomes more mobile and therefore spends a greater amount of time traveling and away from home, demand rises for electronic appliances and devices once traditionally confined to the home environment to be mobile as well. As such, portable and wireless devices such as cellular phones, portable TVs and DVD players, and laptop computers have become increasingly popular. Recently, consoles having video cassette players and screens have been mounted on the floors of vehicles, facilitating video entertainment on the road. In addition, consoles having video players and monitors have been mounted to the ceilings of vehicles for viewing by passengers. In both cases, the video player and monitor cannot be removed from the console or interior of a vehicle. Thus, videos may only be viewed with such systems when occupying the vehicle. This can be inconvenient on family trips for example, where a movie the passengers are watching might be interrupted when stopping at a motel without a VCR, and could not be continued until the trip is resumed. There is also a risk of theft of the video system and corresponding damage to the vehicle when the vehicle is unattended.

Although portable or small TVs with video cassette players can be used inside cars, it is difficult to affix such devices to the interior of a vehicle. When not secured, such devices can become a hazard inside a moving vehicle.

Accordingly, a portable video display and video player which can be conveniently viewed and operated in a variety of environments, including inside vehicles, is highly desirable.

SUMMARY OF THE INVENTION

The present invention is directed to a mobile video system having a pivotable display attached to a video player which can be housed and transported by and operated from within a bag.

In one aspect of the present invention, a mobile video system is provided which comprises a video player for facilitating play of a video medium, the player having a hinge; and a display pivotally attached to said video player from the hinge for facilitating viewing of the display when the video player is disposed in different positions. The video player and display are preferably housed in and operated from within a bag. In addition, the video player includes an input jack for external input from video game players, camcorders, DVD players or computers. The video medium includes a video cassette or a DVD. The display comprises an LCD type monitor or a flat-panel display.

In another aspect of the present invention, the hinge is disposed on a top portion of the video player and the display is pivotable from a stowed position wherein the display lies in a plane parallel to the plane of the control panel, to continuously variable positions about an axis defined by the hinge. The control panel includes controls for operating the video player and an opening for receiving a video medium, for example, a VHS cassette.

In yet another aspect of the present invention, the bag includes a flap cover being partially removable for opening and closing a portion of the bag, wherein said flap cover is opened for accessing the video player and display.

In yet another aspect of the present invention, the bag also includes fastening means for suspending the bag to objects inside a vehicle, such as the front seats, to dispose the video player in an upright position with a control panel facing a ceiling of the vehicle and the display pivots at an angle for viewing by passengers; in this embodiment, the display is pivoted at greater than 90 degrees from the control panel of the player. The fastening means includes one or more of straps, velcro, buckles, snaps, buttons, or hooks.

In yet another aspect of the present invention, the bag includes extensible panels for tilting the suspended video player at an angle to facilitate viewing by a rear passenger of the vehicle. The extensible panels are preferably constructed of a mesh or a netting material for allowing air circulation around the video player. In this embodiment, the display is pivoted to about greater than 120 degrees from the control panel of the video player.

In yet another aspect of the present invention, the bag includes a belt strap for insertion of a safety belt therethrough to secure the bag to a seat of a vehicle such that a panel of the bag is positioned on a horizontal portion of a seat, wherein the display is pivotable to a position viewable by passengers of the vehicle. According to this embodiment, the display is pivoted to an angle greater than 120 degrees from the control panel of the video player.

In yet another aspect of the present invention, the video system includes a receiver for receiving control signals from a remote control device.

These and other aspects, features and advantages of the present invention will be described or become apparent from the following detailed description of the preferred embodiments, which is to be read in connection with the accompanying drawings.

DETAILED DESCRIPTION OF PREFERRED EMBODIMENTS

Figure 1:
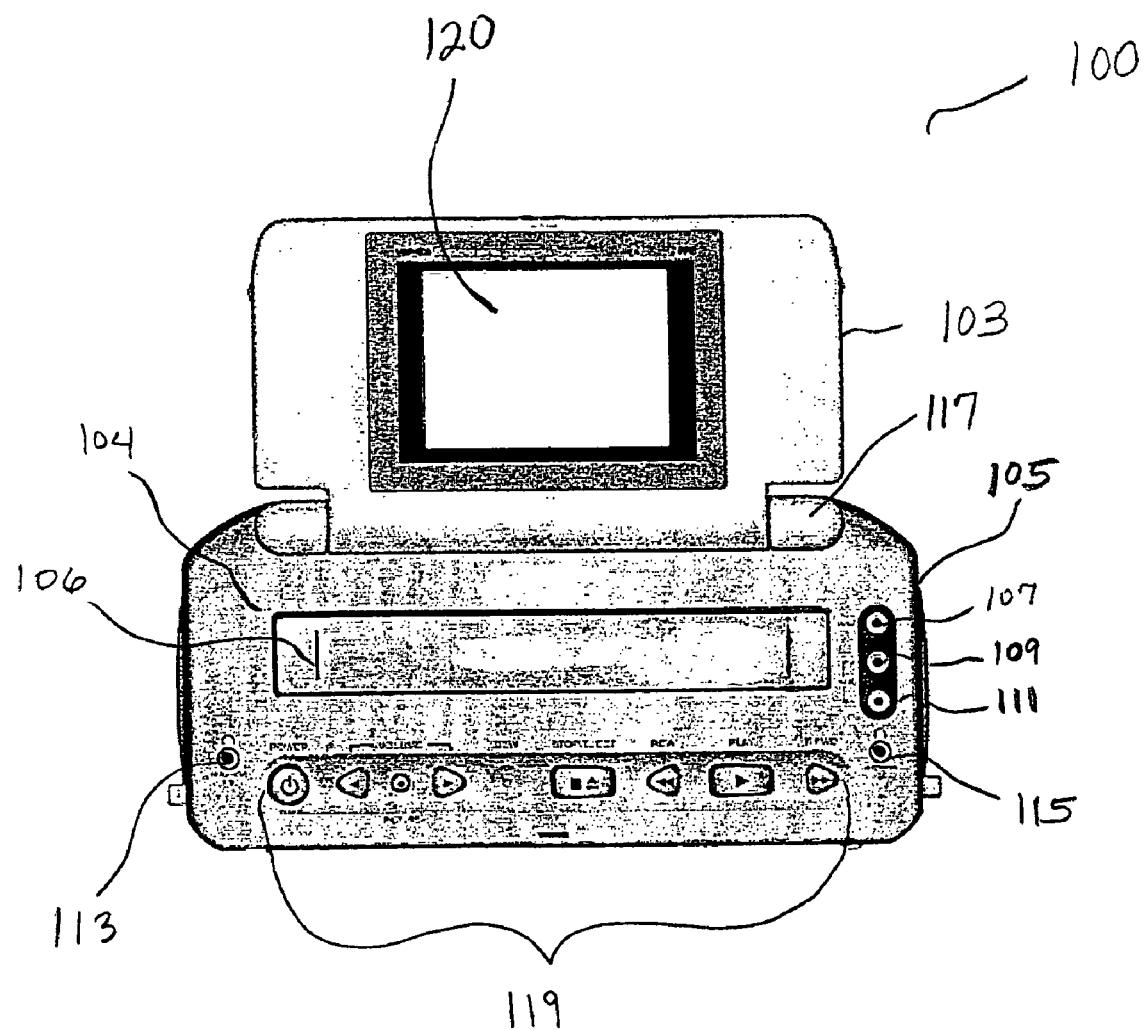
FIG. 1 is an illustration of a video system according to an embodiment of the present invention.

Referring now to FIG. 1, a diagram illustrates an example of the components of a mobile video system according to an embodiment of the present invention. Video unit 100 includes a hinge 117, and a pivotable display 103 pivotally attached to a video player 105 on the hinge 117 for enabling the display to be flipped up and adjusted to a desired viewing angle by a user when in use, and folded down flat against a control panel 104 of the video player 105 when not in use. When folded, the display 103 lies along a plane parallel to the plane of the control panel 104 of the video player 105.

The hinge 117 allows the display 103 to be positioned at various angles for facilitating viewing of the display when the video player 105 is set up in different positions. For example, if the video player is in an upright position (with the control panel being horizontal relative to the ground and facing up), the display 103 is preferably positioned at about a 90 degree angle from the control panel. In another example, if the video player is in a horizontal position (with the control panel in a vertical position relative to the ground), the display is preferably adjusted to about a 180 degree angle from the front control panel of the video player.

The pivotable display 103 comprises an LCD type monitor or flat-panel display. The control panel 104 includes a plurality of control buttons 119 for controlling the functions of the video player, for example, volume control, tape functions such as fast forward, rewind, pause, eject and play, and a power on/off button. The control panel also includes an opening for receiving a video medium, such as a video cassette or a DVD.

For illustrative purposes, the control panel 104 includes, for example, a tape deck 106 for insertion of a video cassette to be viewed, video input jack 107 for optional hookup with outside video sources such as video game players, camcorders, DVD players, or computers, and audio R input jack 109 and audio L input jack 111 for audio input. Headphone 1 jack 113 allows a user to listen to audio with headphones. Using headphone 2 jack 115 allows a second user to listen with headphones. It is to be appreciated that the video player can be equipped to play other video mediums, such as DVD. In addition, it is to be appreciated that the video player can include a receiver for receiving control signals from a remote control device.

Figure 2:
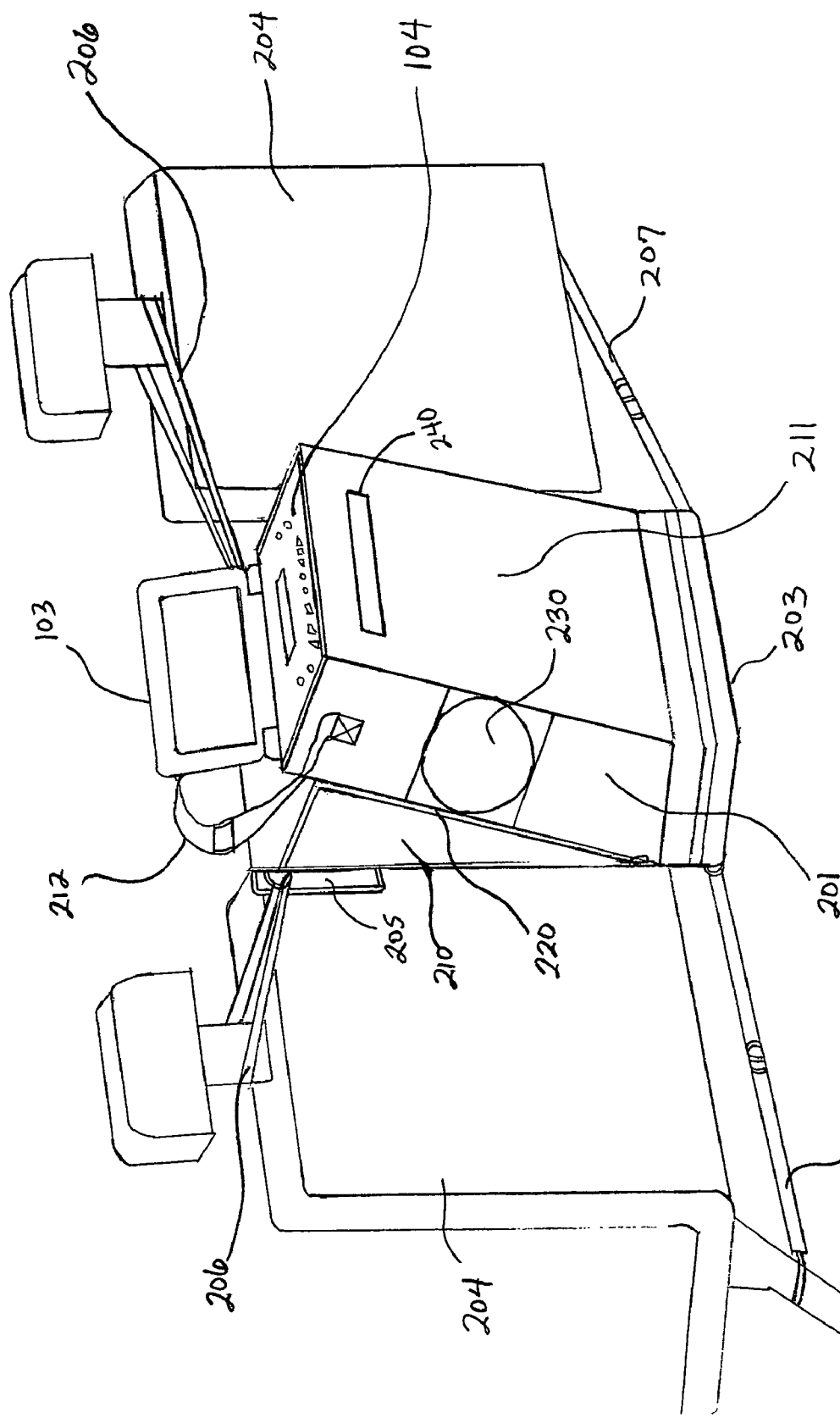
FIG. 2 is an illustration of an installed mobile video system according to an embodiment of the present invention.

FIG. 2 depicts an example of a set up of a mobile video unit according to an embodiment of the present invention. The video unit can be suspended from objects affixed inside a vehicle, for example, between a pair of seats, for viewing by rear seat passenger viewers. For illustrative purposes, FIG. 2 shows the video unit 100 suspended between front seats 204 of a vehicle in a substantially upright position by a bag 203, which includes a compartment for containing the video unit. In this position, a panel 211 of the bag faces the viewers and the control panel of the video player faces a ceiling of the vehicle.

The bag 203 includes a flap cover 205 which is partially removable and can be opened or closed by a user. The flap cover is preferably held closed by Velcro type material 240 disposed at an upper portion of panel 211 of the bag. The flap cover 205 is peeled open from the Velcro, and when opened, permits access to the video player 104 and exposes the display 103. With the bag suspended in the position as shown in the illustrative embodiment of FIG. 2, the display 103 is pivoted to around 90 degrees from the control panel for viewing. When the display 103 is closed, the flap cover 205 can be closed against the Velcro material 240 and the video player 104 and the display 103 cannot be accessed.

In one embodiment, the bag can partially open at an edge 220 to reveal extensible panels 210 for facilitating tilting of the video player at an angle away from the front seats. The tilting of the video player towards a rear passenger viewer facilitates a larger tilting angle of the display 103, for example, at greater than 120 degrees or in this embodiment, around 130 degrees from the control panel of the video player 105 for better viewing for the viewer. The extensible panels are preferably constructed of a mesh or a netting material (not shown) for allowing air circulation around the video player 105.

The bag also includes a ventilation panel 230 for further facilitating air circulation through a side panel 201 of the bag.

Figure 3:
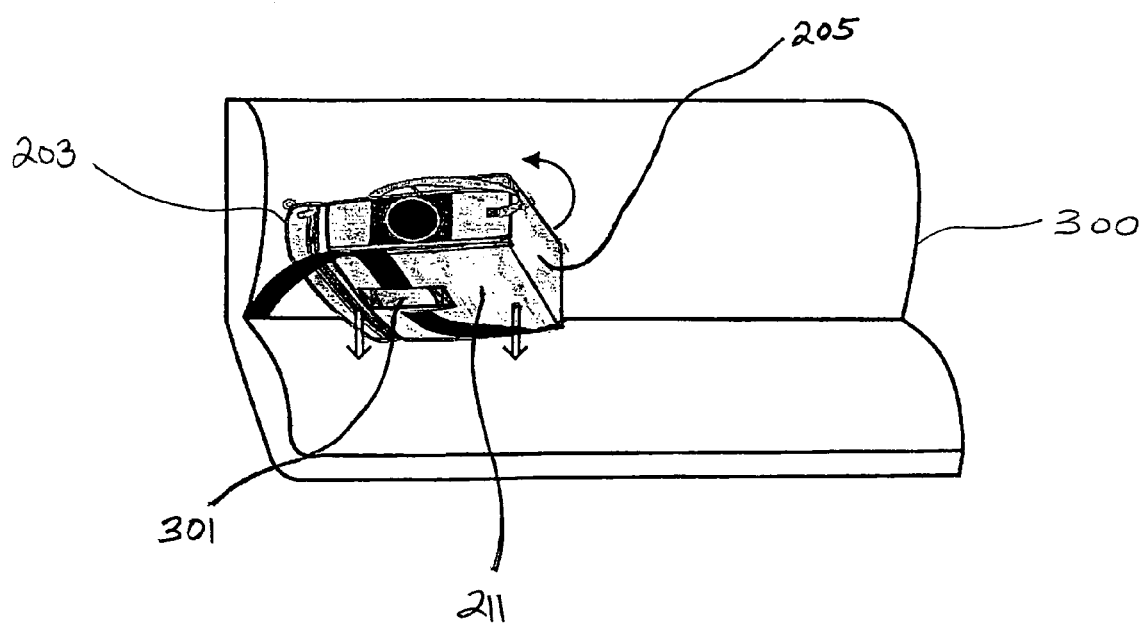
FIG. 3 is an illustration of a mobile video system installed on a seat of a vehicle according to an aspect of the present invention.

The bag 203 preferably includes adjustable upper fastening means 206 to secure and suspend the video bag from, for example, each headrest of front seats 204, and adjustable lower fastening means 207 to secure and suspend the video bag from, for example, each leg of front seats 204, thus positioning the video unit 100 securely between the front seats for viewing. The adjustable upper and lower fastening means includes straps, velcro, buckles, snaps, buttons, or hooks. The bag 203 also includes a carrying strap 212 for carrying the video unit during transport. FIG. 3 depicts an exemplary installation of a mobile video system on a seat of a vehicle according to an aspect of the present invention. The bag 203 includes a belt strap 301 for facilitating insertion of a safety belt therethrough to secure the bag to a horizontal portion of a seat 300. The panel 211 of the bag is positioned on the horizontal portion of seat 300. The flap cover 205 of the bag can be opened for access to the display of the video player by a user. In this embodiment, the display 103 is pivoted to about greater than 120 degrees from the control panel of the video player 105 for viewing.

Figure 4:
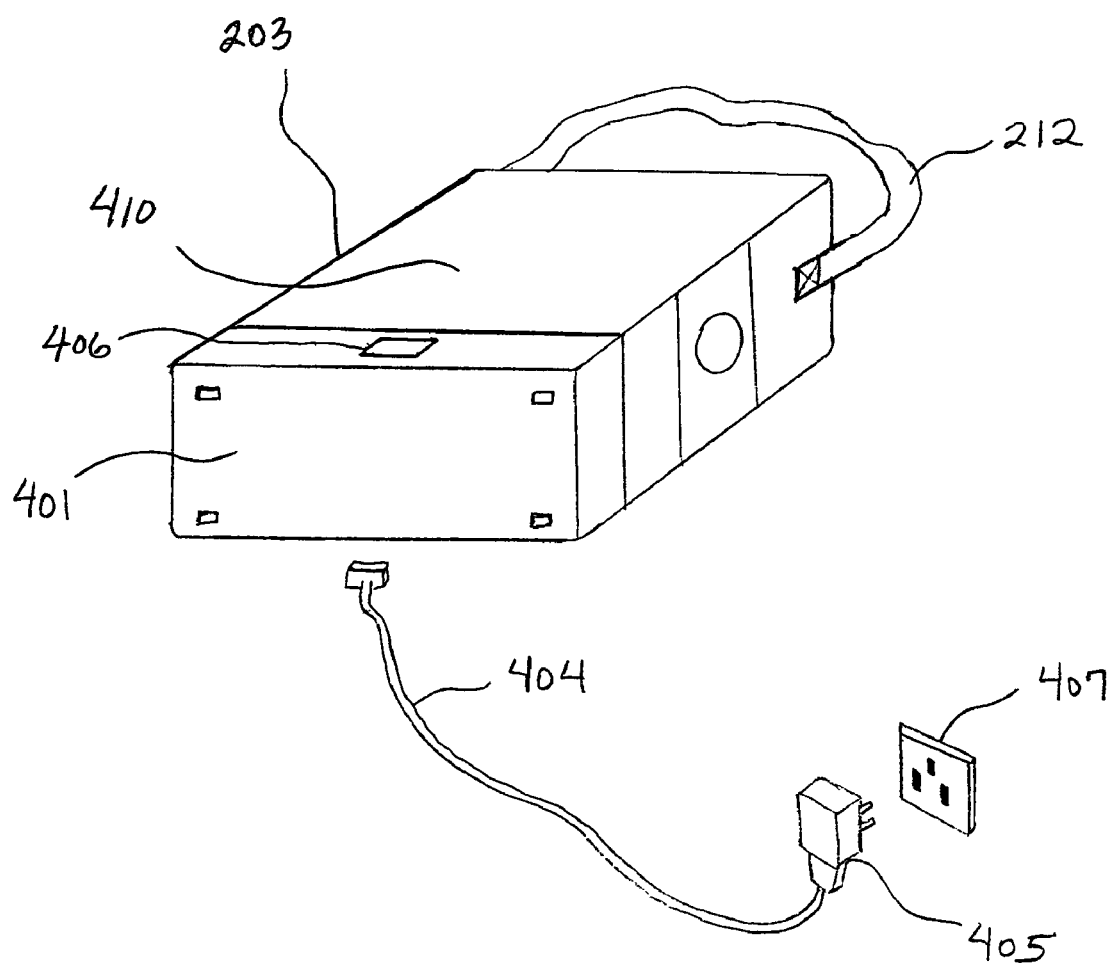
FIG. 4 depicts an exemplary power supply connection of a mobile video system to a wall outlet according to an aspect of the present invention.

FIG. 4 illustrates an exemplary power connection of a mobile video system to a wall outlet. A top face 410 of the bag 203 includes an opening 406 to facilitate insertion of an electrical cord 404 into the video player. The electrical cord may include, for example, an AC-DC adapter 405 for connection to a wall outlet 407.

Figure 5:
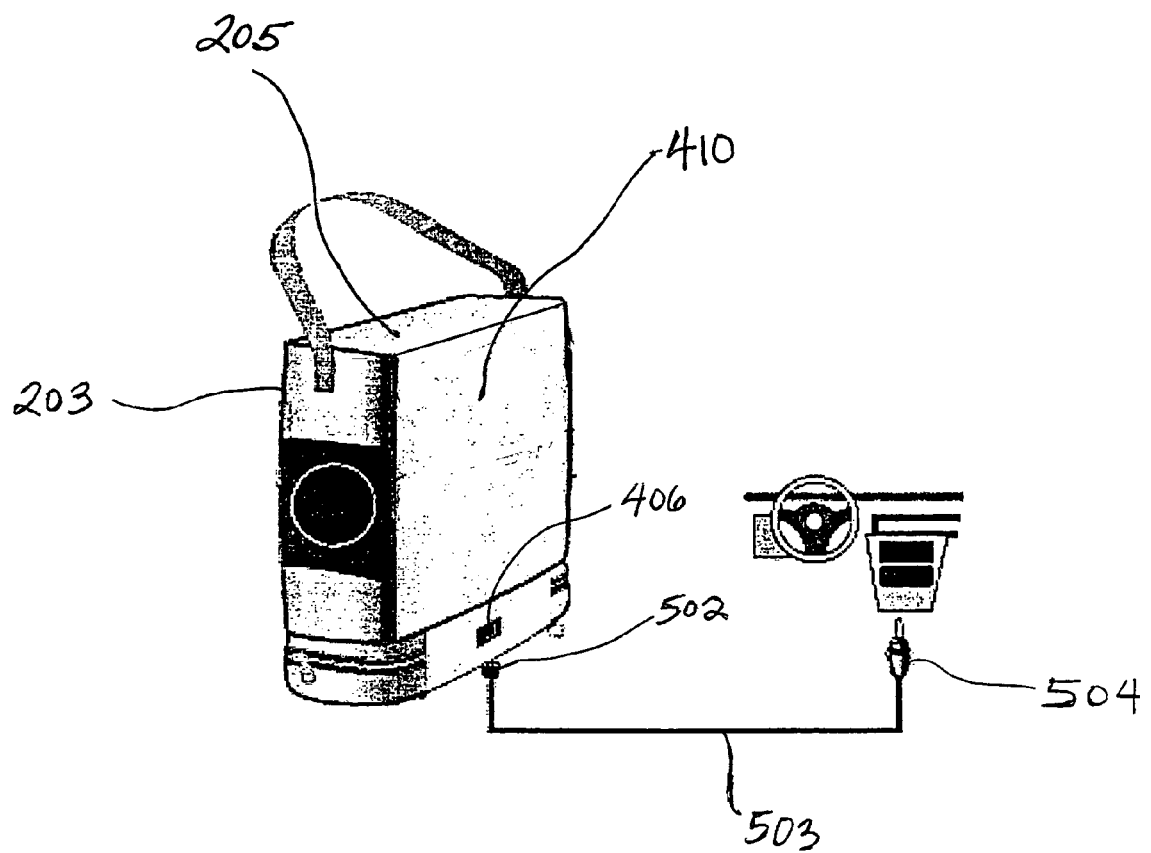
FIG. 5 depicts an exemplary power supply connection of a mobile video system inside a vehicle according to an aspect of the present invention.

FIG. 5 illustrates an exemplary power connection of a mobile video system to a cigarette lighter of a vehicle in an aspect of the present invention. The opening 406 can facilitate connection, for example, to a DC 12V jack 502 of a cord 503. A DC 12V adaptor 504 on cord 503 connects with a cigarette lighter of a vehicle for supplying power to the video unit.

It is to be appreciated that a mobile video system according to the present invention is easily removable from and can be operated outside of a vehicle, for example, in home or office environments. In addition, the bag for containing the video unit can be attached to and thus suspend the video unit from various other objects, such as chairs, walls, doors, etc. It is also to be appreciated that the video unit can be operated when removed from the bag 203.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A mobile video system comprising:
   a video player for facilitating play of a video medium, the player having a control panel;
   a display pivotally attached to said video player, wherein the control panel includes an opening for receiving the video medium, and wherein the display is pivoted at greater than 90 degrees from the control panel of the video player;
   a holder for receiving the video player, the holder including at least two straps extending at oblique angles from opposite sides of the holder and engaging one or more stationary objects in a vehicle, wherein the holder is a bag, the bag having extensible panels for tilting the video player and the display at an angle, wherein the extensible panels extend from a rear edge of a side panel of the bag to a rear panel of the bag.

2. The system of claim 1, wherein the video player includes a hinge, the hinge being disposed on an edge portion of the video player and the display being pivotable about the hinge from a stowed position to variable positions about an axis defined by the hinge.

3. The system of claim 2, wherein the variable positions range from about 0 degrees to about 180 degrees with respect to the control panel.

4. The system of claim 1, further including a receiver for receiving control signals from a remote control device.

5. The system of claim 1, wherein the video medium is a DVD.

6. The system of claim 1, wherein the video player includes an adapter for operating from either an AC or a DC power source.

7. The system of claim 1, wherein the display is an LCD type monitor.

8. The system of claim 1, wherein the video player includes an input jack for external input from one or more of video game players, camcorders, DVD players and computers.

9. The system of claim 1, wherein the bag houses the video player and the display, the bag having a flap cover for opening and closing a portion of the bag, and the at least two straps suspending said bag from the stationary objects inside the vehicle, wherein said flap cover is opened for accessing the video player and the display.

10. The system of claim 9, wherein the objects comprise front seats of a vehicle.

11. The system of claim 9, wherein the bag suspends the video player in an upright position with the control panel facing a ceiling of a vehicle.

12. The system of claim 9, wherein the fastening means comprises one or more of straps, velcro, buckles, hooks, buttons and snaps.

13. The system of claim 9, wherein the extensible panels tilt the video player and display to facilitate viewing by a rear passenger of the vehicle.

14. The system of claim 13, wherein the extensible panels are constructed of a mesh material.

15. The system of claim 13, wherein the display is pivoted to about greater than 120 degrees from the control panel of the video player.

16. A mobile video system comprising:
a video player for facilitating play of a video medium;
a display attached to said video player, wherein the video player comprises a control panel and the display is pivoted at greater than 90 degrees from the control panel; and
a bag for housing the video player and the display, wherein the bag includes extensible panels for tilting the video player and display at an angle to facilitate viewing by a rear passenger of a vehicle, the extensible panels extending from a rear edge of a side panel of the bag to a rear panel of the bag, and fastening means for suspending said bag from objects inside the vehicle, the fastening means including at least two straps extending at oblique angles from opposite sides of the bag and engaging the objects.

17. The system of claim 16, wherein the video player includes a hinge for attaching the display to the video player, the hinge being disposed on an edge portion of the video player and the display being pivotable about the hinge from a stowed position to variable positions about an axis defined by the hinge.

18. The system of claim 16, wherein the video medium is a DVD.

19. The system of claim 16, wherein the display is an LCD type monitor.

20. The system of claim 16, wherein the bag includes a flap cover for opening and closing a portion of the bag, wherein said flap cover is opened for accessing the video player and the display.

21. A portable DVD player comprising:
a body portion;
a control panel on the body portion, wherein the control panel includes a plurality of buttons exclusively for controlling functions of the DVD player and an opening for receiving a DVD; and
a display pivotally attached to the body portion via a hinge, wherein the hinge enables the display to be pivoted to greater than 90 degrees with respect to the control panel, wherein the DVD player is housed in a bag having extensible panels for tilting the DVD player and the display at an angle, wherein the extensible panels extend from a rear edge of a side panel of the bag to a rear panel of the bag.

22. The portable DVD player as recited in claim 21, wherein the hinge enables the display to be pivoted in a range from greater than 90 degrees to about 180 degrees with respect to the control panel.

23. A mobile video system comprising:
a video player for facilitating play of a video medium;
a display pivotally attached to the video player, wherein the video player includes an opening for receiving the video medium, wherein the display is capable of pivoting greater than 90 degrees with respect to the opening; and
a plurality of buttons for controlling functions of the video player, wherein the plurality of buttons are positioned on a side of the video player and the opening for receiving the video medium is positioned on the same side as the plurality of buttons, wherein the video player is housed in a bag having extensible panels for tilting the video player and the display at an angle, wherein the extensible panels extend from a rear edge of a side panel of the bag to a rear panel of the bag.

24. The mobile video system of claim 23, wherein the display is capable of pivoting in a range from greater than 90 degrees to about 180 degrees with respect to the opening.

25. The mobile video system of claim 23, wherein the display is capable of pivoting in a range from about 0 degrees to about 90 degrees with respect to the opening.

* * * * *